UNITED STATES PATENT OFFICE.

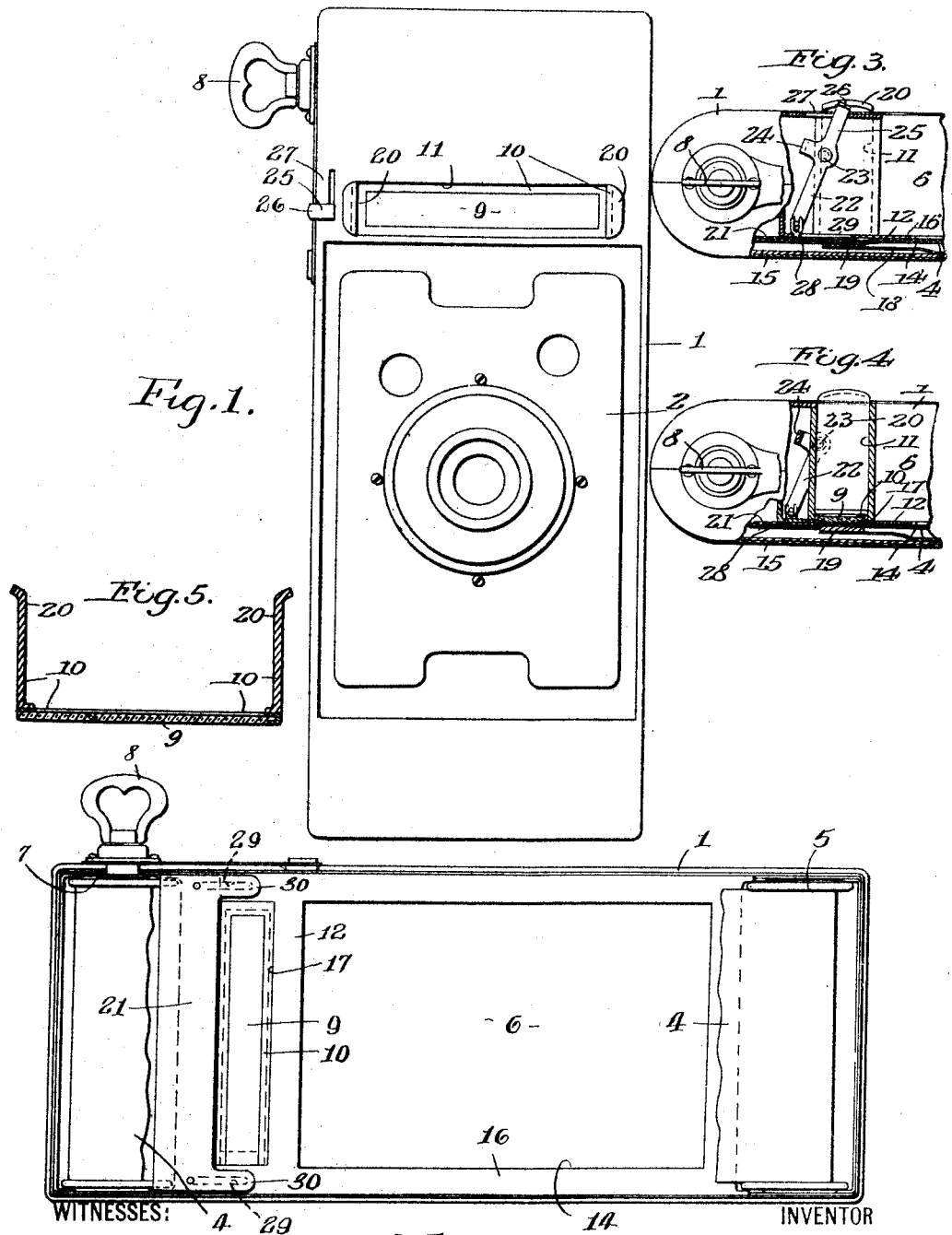

DONALD M. DEY, OF SYRACUSE, NEW YORK.

AUTOGRAPHIC CAMERA.

1,368,614.  Specification of Letters Patent.  Patented Feb. 15, 1921.

Application filed October 19, 1915. Serial No. 56,784.

*To all whom it may concern:*

Be it known that I, DONALD M. DEY, a citizen of the United States, and a resident of Syracuse, in the county of Onondaga and State of New York, have invented a certain new and useful Autographic Camera, of which the following is a specification.

This invention relates to cameras, and has for its object a particularly simple, efficient, and permanent means associated with the camera itself, and not with the film or other sensitized element, by which means signatures, notations, and other marks can be made upon the film, or other sensitized element exposed in the camera; and the invention consists in the novel features hereinafter set forth and claimed.

In describing this invention reference is had to the accompanying drawings in which like characters designate corresponding parts in all the views.

Figure 1 is a front elevation of a camera embodying my invention.

Fig. 2 is a rear elevation of the camera, the back cover plate being removed and the film being broken away.

Fig. 3 is a fragmentary plan view, partly in section, of a folding camera embodying my invention, the bellows being removed.

Fig. 4 is a view similar to Fig. 3, the passage in which the writing tablet is located being shown in section and the shield being out of operative position.

Fig. 5 is a detail sectional view of the writing tablet and holder therefor.

This invention comprises a camera having a writing tablet carried by the body of the camera on the front side thereof and outside of the light projecting chamber, in position to overlie a portion of the film, plate or other sensitized element located in the body of the camera.

I have here shown my inventon as embodied in a folding camera and located at one side of the bellows which inclose the light projecting chamber.

1 designates the body or box of the camera. 2 is the front end thereof which supports the lens and shutter and which is connected to the body by bellows not shown.

4 designates the sensitized element as a film which unwinds from one spool 5 at one end of the box, extends across the impression receiving space at 6 at the back of the light projecting chamber, and winds onto a winding spool 7 at the other end of the box, the spool 7 being connected in any suitable manner to a handle 8.

10 designates the writing tablet, a portion of which is penetrable and another portion of which is impenetrable by light rays after being written on and preferably the entire tablet is normally penetrable by light rays and a portion thereof is rendered impenetrable by the opaque line written thereon by a pencil or pen. This tablet may be made of any suitable material, but one material suited therefor is transparent, or translucent ground glass having a surface rough enough to be written on by an ordinary pencil, the line drawn by the pencil constituting a coating impenetrable to light rays. As here shown the tablet is arranged to overlie the front side of the sensitized element, or film at one side of the light projecting chamber, and is exposed on the front side of the camera. Said tablet is entirely independent of the film and the wrapper thereof or other sensitized element, so that it is in no way acted on, during the winding of the film or the removal of the plate, and is in no way a part of the sensitized element but on the contrary is a permanent part of the camera. As here shown, the tablet 9 is permanently carried by a holder 10 movable into a passage 11, located at one side of the light projecting chamber, said tablet being movable to the bottom of said passage, near or contiguous to, the film or other sensitized element where it passes across the inner end of the passage 11. The walls of the passage 11 rest upon a plate 12 having an opening 14 through which the plate or film in the light projecting chamber is exposed, which film or plate is located in the space between the plate 12 and the back plate 15. In ordinary camera construction, the bellows is secured to the margins 16 of the plate 12 around the opening 14. The passage 11 is alined with a passage 17 in the plate 12 and the tablet 9 is located in the passage 17 when in operative position. The film or sensitized element is pressed against the tablet by spring means, here shown as leaf springs 18 fixed at corresponding ends to the back plate 15 and having a cross bar or shoe 19 at their free ends, which bar engages and presses the film against the tablet 9. The holder 10, as here shown, is provided with upwardly extending arms or clips 20 at its ends which frictionally engage the end walls of the passage 11 and hold the tablet in the passage 11, these arms having outwardly turned lips at their upper ends by which the holder is readily manipulated.

The means for controlling the passage of light to the sensitized element through the tablet, comprises a shutter or shield 21 movable into and out of position between the tablet and the underlying portion of the film or sensitized element, the shutter or shield 21 being here shown as slidable along the plate 12 of the camera laterally crosswise of the lower end of the passage 11 between the tablet 9 and the sensitized element or film.

The shield 21 is operable by levers 22 pivoted at 23 to opposite end walls of the passage 11, these levers being connected by a cross bar 24, and one of the levers having an arm 25 extending through the front side of the body or box of the camera, said arm 25 having an angular extension 26 on the exterior of the box, extending over the upper surface of the box at 27 where it is provided with a hand engaging part by means of which the shutter can be operated. The levers 22 are connected to the shutter or shield 21 at 28 by pin-and-slot connections, said pins extending through slots 29 in the plate 12, which slots are closed to keep light from the film, by covers 30 projecting from the shutter or shield.

In operation, a signature, notation or other marks can be made upon the film or sensitized element at the time a photograph is taken, by removing the holder 10 with the ground glass tablet 9 therein, writing the signature, notation or other mark on the tablet on the lower face, that is, the face opposed to the film or sensitized element, the writing forming a coating impenetrable to light rays. The holder is then replaced in the passage 11 and the shutter or shield 21 operated to momentarily expose the tablet to the action of the light rays. As the shutter uncovers the tablet 9, the springs 18 press the film against the tablet 9. When the sensitized element is developed a transparent line corresponding to the opaque line of the writing will be left thereon so that when the print is made from the developed film or plate, the writing will be in a black line.

When the signature is to be placed upon another film and other notations made, the holder is removed and the writing thereon erased, and the desired matter written on the tablet which is replaced in the camera. This autographic means for cameras is particularly advantageous in that it is independent of the film and film wrapper or other sensitized element and is readily operated, and further in that one tablet can be used for an unlimited number of exposures.

What I claim is:

1. A camera comprising a body having a chamber for receiving the sensitized element, a light projecting chamber, and a passage leading through a forward wall of the body so as to admit light to the front surface of the sensitized element, said passage being located outside of the light projecting chamber and opening into the first mentioned chamber, a writing tablet movable into and along said passage so as to overlie a portion of the front side of said element, means for controlling the admission of light to said element through the passage and the tablet, a backing member in the camera between which and the tablet the film is pressed and means for pressing the sensitized element between said backing member and tablet, substantially as and for the purpose set forth.

2. A camera comprising a body having a chamber for receiving the sensitized element, a light projecting chamber, and a passage opening through a forward wall of the body so as to admit light to the front surface of the sensitized element in the first-mentioned chamber, said passage being located at one side of the light projecting chamber, a tablet supported in said passage so as to overlie a portion of the front side of the sensitized element, the tablet being adapted to receive a line or coating of material impenetrable to light rays, whereby said portion of the sensitized element may be exposed to light passing through said tablet, and means for controlling the admission of light to said element through said passage, substantially as and for the purpose described.

3. A camera comprising a body having a chamber for receiving the sensitized element, a light projecting chamber, and a passage leading through a forward wall of the body, so as to admit light to the front surface of the sensitized element, said passage being located outside of the light projecting chamber and opening into the first mentioned chamber, a writing tablet movable flatwise into and along said passage so as to overlie a portion of the front side of said element, and means for controlling the admission of light to said element through the passage and the tablet, substantially as and for the purpose described.

4. A camera comprising a body having a chamber for receiving the sensitized element, a light projecting chamber, and a passage leading through a forward wall of the body so as to admit light to the front surface of the sensitized element, said passage being located outside of the light projecting chamber and opening into the first mentioned chamber, a writing tablet movable into and along said passage so as to overlie a portion of the front side of said element, means for controlling the admission of light to said element through the passage and the tablet, and means for pressing the sensitized element against the tablet, substantially as and for the purpose set forth.

5. A camera comprising a body having a chamber for receiving the sensitized element, a light projecting chamber and a passage leading from the front wall of the body, opening into the first mentioned chamber and located outside of the light projecting chamber, a writing tablet of ground glass removably insertible through the passage into a position to overlie a portion of the sensitized element in the first-mentioned chamber, and means for controlling the admission of light through said passage and tablet, substantially as and for the purpose described.

6. A camera comprising a body formed with a chamber for receiving the sensitized element, a light projecting chamber, and a passage leading from the front wall of the body, opening into the first-mentioned chamber and located outside of the light projecting chamber, a writing tablet movable flatwise into and along the passage, to overlie a portion of the sensitized element in the first-mentioned chamber, a holder for the tablet, the holder having means coacting with the walls of the passage to retain the said holder in the passage, and means for controlling the admission of light through the passage and the tablet, substantially as and for the purpose specified.

7. An autographic camera comprising a body having a passage opening through a wall thereof, a writing tablet penetrable by light rays, and located in the passage so as to overlie the sensitized element in the body, spring means to press the sensitized element toward the tablet, and means to control the admission of light to said element through said passage, substantially as and for the purpose described.

8. An autographic camera comprising a body having a passage opening through a wall thereof, a writing tablet penetrable by light rays and located in the passage so as to overlie a portion of the sensitized element in the body, a shield movable edgewise transversely of the passage between the tablet and said element, and spring means for pressing said element against the tablet, substantially as and for the purpose specified.

9. A camera comprising a body having a chamber for receiving the sensitized element, a light projecting chamber and a passage opening through a forward wall of the body into the first-mentioned chamber, so as to admit light to the front surface of the sensitized element, said passage being located outside of the light projecting chamber, a writing tablet supported in said passage so as to overlie a portion of the front side of the sensitized element and means for controlling the admission of light to said element through the passage and the tablet, substantially as and for the purpose set forth.

In testimony whereof, I have hereunto signed my name, at Syracuse, in the county of Onondaga, and State of New York, this 15th day of September, 1915.

DONALD M. DEY.